United States Patent
Brand et al.

(10) Patent No.: US 12,114,685 B2
(45) Date of Patent: Oct. 15, 2024

(54) PROTEIN BAR

(71) Applicant: GELITA AG, Eberbach (DE)

(72) Inventors: Anne-Sophie Brand, Heidelberg (DE); Martin Hahn, Gronau (DE); Elvira Lang, Heilbronn (DE)

(73) Assignee: GELITA AG, Eberbach (DE)

( * ) Notice: Subject to any disclaimer, the term of this patent is extended or adjusted under 35 U.S.C. 154(b) by 780 days.

(21) Appl. No.: 17/170,033

(22) Filed: Feb. 8, 2021

(65) Prior Publication Data

US 2021/0177030 A1 Jun. 17, 2021

Related U.S. Application Data

(63) Continuation of application No. PCT/EP2019/070349, filed on Jul. 29, 2019.

(30) Foreign Application Priority Data

Aug. 22, 2018 (DE) .................. 10 2018 120 420.5

(51) Int. Cl.
| | |
|---|---|
| *A23L 33/18* | (2016.01) |
| *A23J 3/04* | (2006.01) |
| *A23J 3/34* | (2006.01) |
| *A23L 29/00* | (2016.01) |
| *A23L 29/281* | (2016.01) |
| *A23L 29/30* | (2016.01) |
| *A23L 33/19* | (2016.01) |

(52) U.S. Cl.
CPC .............. *A23L 33/18* (2016.08); *A23J 3/04* (2013.01); *A23J 3/342* (2013.01); *A23L 29/035* (2016.08); *A23L 29/284* (2016.08); *A23L 29/35* (2016.08); *A23L 29/37* (2016.08); *A23L 33/19* (2016.08); *A23V 2002/00* (2013.01)

(58) Field of Classification Search
CPC .......... A23L 33/18; A23L 29/284; A23J 3/342
See application file for complete search history.

(56) References Cited

U.S. PATENT DOCUMENTS

| | | | | |
|---|---|---|---|---|
| 4,543,262 | A | * 9/1985 | Michnowski | ........ A23G 3/0242 426/103 |
| 2003/0170346 | A1 | * 9/2003 | McCabe | .................. A23G 1/44 426/89 |
| 2009/0269455 | A1 | 10/2009 | Hoffmann et al. | |
| 2013/0345139 | A1 | 12/2013 | Oesser et al. | |

(Continued)

FOREIGN PATENT DOCUMENTS

| | | |
|---|---|---|
| DE | 102007002295 A1 | 7/2008 |
| DE | 102011000997 A1 | 9/2012 |

(Continued)

OTHER PUBLICATIONS

International Bureau and International Search Report in International Application No. PCT/EP2019/070349, mailed Nov. 21, 2019.

*Primary Examiner* — Jenna A Watts
(74) *Attorney, Agent, or Firm* — Leydig, Voit & Mayer, Ltd.

(57) ABSTRACT

The present invention relates to a protein bar that is formed from a moldable mixture containing proteins and/or protein hydrolysates. The moldable mixture contains a collagen hydrolysate having an average molecular weight of up to 1,700 Da as a protein hydrolysate.

20 Claims, 1 Drawing Sheet

(56) References Cited

U.S. PATENT DOCUMENTS

2015/0232534 A1  8/2015  Oesser et al.
2019/0262430 A1  8/2019  Oesser et al.

FOREIGN PATENT DOCUMENTS

DE   102012110612 A1   5/2014
DE   102017102873 A1   3/2018
WO   WO 2017/134245 A1   8/2017
WO   WO 2018/041684 A1   3/2018

* cited by examiner

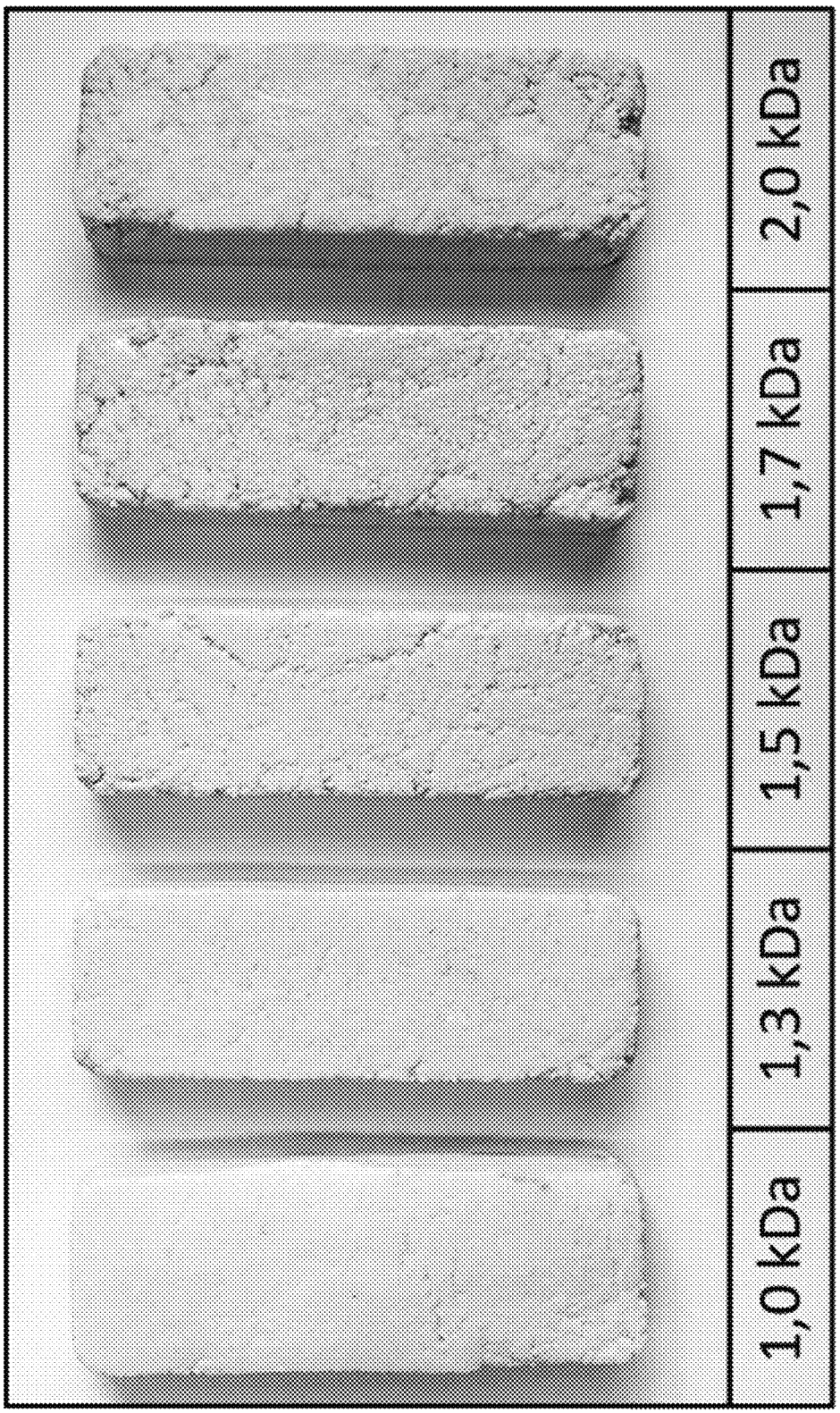

PROTEIN BAR

CROSS-REFERENCE TO RELATED APPLICATIONS

This patent application is a Continuation of International Patent Application No. PCT/EP2019/070349, filed on Jul. 29, 2019, which claims the benefit of German Patent Application No. 10 2018 120 420.5, filed on Aug. 22, 2018, which are each incorporated by reference in its entirety herein.

BACKGROUND OF THE INVENTION

The present invention relates to a protein bar that is formed from a moldable mixture containing proteins and/or protein hydrolysates.

BRIEF SUMMARY OF THE INVENTION

In particular among athletes, protein bars are enjoying a growth in popularity. They make it possible to supply a relatively large amount of proteins in the form of a handy foodstuff that is storable and easy to transport. When combined with physical activity, a high supply of protein is nutritionally sensible, in particular having the aim of promoting muscle development.

A number of aspects have to be taken into account when formulating protein bars, with some of the different requirements being contradictory. On the one hand, as high a protein content as possible is desirable, with carbohydrates and in particular sugar to be avoided as far as possible, on nutritional grounds. On the other hand, the formulation must have a suitable consistency—that is to say, the mixture formed from the different constituents must be moldable such that a bar that is dimensionally stable over the long term can be formed therefrom. The bar should thus neither be runny nor break up too readily.

A further important aspect is the taste and texture of the protein bar during biting and chewing. In order to achieve the highest possible consumer acceptability, the properties of a protein bar should approximate as closely as possible in this respect to comparable treats such as chocolate bars. However, hitherto it was hardly possible to achieve this objective, in particular not in the case of very high protein contents above 60 weight %.

It is thus the object of the invention to propose a protein bar of which the mixture is readily moldable and that has an improved, in particular softer, texture.

This object is achieved according to the invention with the protein bar of the type mentioned in the introduction in that the moldable mixture contains a collagen hydrolysate having an average molecular weight of up to 1,700 Da as a protein hydrolysate.

Surprisingly, it has been shown that adding a collagen hydrolysate of this kind improves the moldability of the mixture—that is to say the mixture becomes less crumbly—and that the texture of the protein bar is softer—that is to say the mouthfeel is improved during consumption.

Interestingly, a comparable effect cannot be achieved using known plasticizers such as glycerol, in particular in the case of protein bars having a high protein content.

BRIEF DESCRIPTION OF THE SEVERAL VIEWS OF THE DRAWING

FIG. 1 presents a photographic representation of different protein bars of moldable mixtures with different collagen hydrolysates.

DETAILED DESCRIPTION OF THE INVENTION

In the context of the present invention, the wording "formed from a moldable mixture" does not only mean that the starting mixture has the moldability required for shaping the bar, but also that this same moldability is still present in the protein bar according to the invention, as the end product. In fact, the moldability results in the desired consistency and texture of the protein bar during consumption, as a result of which the bar according to the invention also differs in particular from other protein-containing snacks that have a crisp or brittle texture.

In order to achieve the effect according to the invention, the low average molecular weight of 1,700 Da or less in the collagen hydrolysate used is crucial. Other collagen hydrolysates, which are already much used in the prior art because of their biological activity in foodstuffs or food supplements, typically have an average molecular weight in the range of 2,000 to 5,000 Da. The texture of the protein bar cannot be improved, or at least not by more than a negligible extent, using these products.

Preferably, the collagen hydrolysate has an average molecular weight of 800 to 1,700 Da, more preferably 1,000 to 1,500 Da. In the context of the present description, all the figures given refer to the weight-average molecular weight of the collagen hydrolysate. This can be determined in particular by gel permeation chromatography using calibrated standard peptides.

Preferably, the collagen hydrolysate is produced by enzymatic hydrolysis of a collagen-containing starting material. For this hydrolysis, in particular endopeptidases or exopeptidases of microbial or plant origin are used. A suitable selection of the peptidases and the hydrolysis conditions allows collagen hydrolysates in the respectively required molecular weight range to be produced.

The collagen-containing starting material is typically selected from the skin or bones of vertebrates, preferably mammals or birds, and in particular from the skin of cattle or pigs (bovine split or pork rind). As an alternative, the collagen-containing starting material may be selected from the skin, bones and/or scales of fish, in particular cold-water or warm-water fish.

The collagen hydrolysate can either be produced in a one-step method from these starting materials, or by way of the intermediate stage of gelatin, in which case both type A gelatin and type B gelatin can be used.

As an alternative, the collagen hydrolysate for the protein bar according to the invention may be produced by recombinant gene expression. By using natural collagen sequences, in particular from cattle or pigs, and the expression thereof in genetically modified cells (such as yeasts, bacteria or plant cells, in particular tobacco), products that are substantially identical to the hydrolysis products of the corresponding collagen-containing raw materials may be produced. Here, it is possible to obtain a relatively narrow or precisely predetermined distribution of molecular weights.

The proportion of collagen hydrolysate in the moldable mixture is favorably in the range of 5 to 50 weight %, preferably in the range of 30 to 50 weight %. Here, it depends in particular on the rest of the composition of the moldable mixture what proportion of collagen hydrolysate is required to improve the texture. In particular with a high total protein content, a relatively high proportion of collagen hydrolysate will frequently also be used. On the other hand, it may also be desirable to increase the proportion of collagen hydrolysate further, independently of improving the texture, in order to exploit the nutritional advantages of collagen hydrolysate, in particular its bioactive effect on the bones and joints.

The total protein content of the protein bar according to the invention may vary over a broad range, wherein the plasticizing action of the collagen hydrolysate of low molecular weight comes into effect even with relatively low protein contents. Because of this effect, however, according to the invention it is also possible to obtain high protein contents which, without the addition according to the invention of collagen hydrolysate, would not give mixtures that are moldable or comestible (too hard). According to an advantageous embodiment of the invention, the moldable mixture therefore contains a total quantity of proteins and/or protein hydrolysates of at least 50 weight % of the moldable mixture, preferably at least 60 weight %, more preferably at least 65 weight %.

The quantitative proportions indicated above always refer to the mass of the pure proteins or protein hydrolysates—that is to say after the deduction of any water content in the components used.

Favorably, in addition to collagen hydrolysate the moldable mixture contains one or more proteins and/or protein hydrolysates, in particular in the case of a high total protein content. These may also be selected in particular on nutritional grounds. Preferably, the further proteins and/or protein hydrolysates are selected from milk proteins, whey proteins, soy proteins, wheat proteins and the hydrolysates thereof, and further collagen hydrolysates. These last are in particular collagen hydrolysates that have a higher or different bioactivity from the collagen hydrolysate that is present for the purpose of improving the texture, with an average molecular weight of up to 1,700 Da.

The proportion of collagen hydrolysate provided according to the invention in relation to the total quantity of proteins and/or protein hydrolysates is, in a preferred embodiment of the invention, in the range of 10 to 70 weight %.

Further preferred constituents of the protein bar according to the invention are in particular components of which the use is known from the prior art.

Favorably, the moldable mixture further contains one or more vegetable fats. These are preferably selected from coconut oil, palm oil, sunflower oil and cocoa butter. The content of vegetable oils is typically in the range of 5 to 15 weight % of the moldable mixture.

Because of nutritional considerations, protein bars typically contain no sugar—that is to say mono- and disaccharides—although the use of these is not excluded from the scope of the invention. Instead, it is preferable for the moldable mixture further to contain one or more sugar substitutes. These include in particular various sugar alcohols and indigestible polysaccharides such as oligofructose and inulin. The sugar substitute or substitutes in the protein bar according to the invention are preferably selected from glycerol, sorbitol and oligofructose.

The use of glycerol is also preferred because it acts as a humectant in the protein bar according to the invention.

Finally, the moldable mixture may further contain one or more flavorings and/or sweeteners.

In the context of the present invention, the density of the moldable mixture (and of the protein bar formed therefrom) is typically 0.9 g/cm$^3$ or more, preferably 1.0 g/cm$^3$ or more.

In a preferred embodiment of the protein bar according to the invention, the moldable mixture contains:
  5 to 50 weight % of collagen hydrolysate, preferably 30 to 50 weight %;
  0 to 45 weight % of further proteins and/or protein hydrolysates, preferably 5 to 30 weight %;
  5 to 15 weight % of vegetable fat;
  5 to 15 weight % of glycerol; and
  5 to 15 weight % of water.

As mentioned above, here too the quantitative proportions indicated refer to anhydrous collagen hydrolysate or further proteins and/or protein hydrolysates.

The protein bar according to the invention may be produced in different portion sizes. In particular, the protein bar may have a weight of 5 to 100 g, preferably 30 to 60 g.

Further, the present invention relates to the use of collagen hydrolysate having an average molecular weight of up to 1,700 Da for producing a moldable mixture for a protein bar.

Particular advantages and preferred embodiments of the use according to the invention have already been explained in conjunction with the protein bar according to the invention.

These and further advantages of the invention are described in more detail by way of the examples below, with reference to the Figures. Individually, these are as follows:

Example 1

In order to investigate the influence of the average molecular weight of the collagen hydrolysate on the moldability and texture of protein bars, five different protein bars were produced from moldable mixtures, differing only in respect of the type of collagen hydrolysate used, and having the composition indicated in Table 1.

TABLE 1

| Constituents | Weight portion, in wt % |
| --- | --- |
| Collagen hydrolysate | 40 |
| Milk and whey proteins | 32 |
| Glycerol | 9 |
| Cocoa butter, as a vegetable fat | 9 |
| Flavor, sucralose | <1 |
| Water | 10 |

Because of the water content, which is approximately 10 weight % in each case, the effective quantitative proportions in the moldable mixtures are approximately 36 weight % of collagen hydrolysate and approximately 29 weight % of milk and whey proteins.

The average molecular weight of the collagen hydrolysate in the different moldable mixtures A to E is indicated in Table 2.

TABLE 2

| Moldable mixture | A | B | C | D | E |
| --- | --- | --- | --- | --- | --- |
| Average mol. wt. in Da | 1,000 | 1,300 | 1,500 | 1,700 | 2,000 |

In each case 40 g of the moldable mixtures A to E was used to mold protein bars A to E with dimensions of approximately 9 cm-3.5 cm-1 cm. Thus, protein bars A to D are protein bars according to the invention with molecular weights of collagen hydrolysate of up to 1,700 Da, whereas the protein bar E is a comparison example.

The protein bars A to E that were produced have a very high total protein content of 65 weight %.

FIG. 1 shows a photographic representation of the five protein bars A to E, indicating the average molecular weight of the collagen hydrolysate contained. It can be seen that the moldability of the mixture decreases as the molecular weight increases—that is to say the protein bars that are produced become increasingly crumbly. Here, bar A visibly has a particularly homogeneous structure, as a result of the particularly good moldability of mixture A.

Furthermore, the texture of protein bars A to E was analyzed using a Warner-Bratzler shearing device, specifically using a texture analyzer TA.XTplus from Stable Micro Systems. During this texture analysis, the sample is put on a baseplate and deformed or severed by a blade that is moved downwards at constant speed. This is a standard test in the food industry, intended to simulate the behavior of a product when bitten, with the result that the test result correlates with the sensory impression during consumption.

The analysis was carried out with a blade 7 cm wide and 0.3 cm thick, moved downwards at a speed of 0.7 mm/s until a deformation of 90% is achieved. For each protein bar, three measurements were carried out and the average found.

The measurement result from this texture analysis is the maximum exertable force, in grams, that is required for a corresponding deformation of the protein bar. The results for protein bars A to E are indicated in Table 3.

TABLE 3

| Protein bar | A | B | C | D | E |
|---|---|---|---|---|---|
| 1$^{st}$ measurement | 1,828 g | 2,524 g | 2,940 g | 4,204 g | 5,641 g |
| 2$^{nd}$ measurement | 1,814 g | 2,457 g | 3,206 g | 4,820 g | 5,296 g |
| 3$^{rd}$ measurement | 1,819 g | 2,693 g | 2,855 g | 4,272 g | 4,900 g |
| Average | 1,820 g | 2,558 g | 3,000 g | 4,432 g | 5,279 g |

The strong correlation between the average molecular weight of the collagen hydrolysate and the rigidity of the protein bar can be clearly seen from these results. For a texture that is acceptable in the mouth, the measurement value with a bar of this kind should be below approximately 5,000 g. Above this value, the protein bar is so rigid that it is regarded as uneatable. This requirement is met by protein bars A to D according to the invention but not by the comparison example E.

The examples thus show that the addition according to the invention of a collagen hydrolysate having an average molecular weight of up to 1,700 Da makes it possible to produce a protein bar, even with a high total protein content, that has a soft texture that is acceptable to the consumer.

Example 2

Whereas the moldable mixtures for the protein bars according to Example 1 were produced on a laboratory scale, in batches each of 300 g, the present example shows the production of protein bars on a small-batch system. For this, a moldable mixture having a collagen hydrolysate with an average molecular weight of 1,200 Da was produced in a batch of 3,000 g, with the composition indicated in Table 4.

TABLE 4

| Constituents | Weight portion, in wt % |
|---|---|
| Collagen hydrolysate with 1,200 Da | 42 |
| Milk and whey proteins | 31 |
| Glycerol | 7 |
| Cocoa butter, as a vegetable fat | 7 |
| Flavor, sucralose, cocoa powder | <1 |
| Water | 12 |

Taking into account the respective water contents, the effective quantitative proportion of proteins and/or protein hydrolysates is approximately 66 weight % of the moldable mixture.

Despite the high protein content, it was possible to work the mixture into protein bars on a small-batch system, with good moldability. This shows that protein bars according to the invention can be produced with a high protein content under real production conditions.

Example 3

Protein bars having a somewhat smaller total protein content were produced on a laboratory scale (batch size 300 g), using two different collagen hydrolysates. The composition of the moldable mixture is indicated in Table 5.

TABLE 5

| Constituents | Weight portion, in wt % |
|---|---|
| Collagen hydrolysate | 20 |
| Milk and whey proteins | 37 |
| Maltodextrin | 11 |
| Glycerol | 10 |
| Cocoa butter | 10 |
| Cocoa powder | 2 |
| Flavor, sucralose | <1 |
| Water | 10 |

After deducting the water content, the effective total quantity of proteins and/or protein hydrolysates in this example is approximately 51 weight %.

In the formulation above, there was used for the moldable mixture F (comparison example) a collagen hydrolysate having an average molecular weight of 3,000 Da, and for the moldable mixture G according to the invention there was used a collagen hydrolysate having an average molecular weight of 1,200 Da.

For both mixtures, the respective moldability during the production of a bar was assessed, a texture analysis was carried out (as described in Example 1) and the density of the moldable mixture was determined. The results are indicated in Table 6.

TABLE 6

| Moldable mixture/bar | F | G |
|---|---|---|
| Average mol. wt. of the collagen hydrolysate | 3,000 Da | 1,200 Da |
| Moldability | good | better (softer) |
| Texture analysis (average of three measurements) | 3,580 g | 2,670 g |
| Density | 1.01 g/cm$^3$ | 1.03 g/cm$^3$ |

This example shows that with a relatively low total protein content, even when using a collagen hydrolysate of higher molecular weight, it is possible to produce protein bars having acceptable moldability and texture. In this case too, however, these properties can still be markedly improved if a collagen hydrolysate of low molecular weight is used according to the present invention.

The invention claimed is:
1. A protein bar that is formed from a moldable mixture containing proteins and/or protein hydrolysates,
wherein the moldable mixture contains a collagen hydrolysate having an average molecular weight of 1,000 to 1,500 Da as a protein hydrolysate, and wherein the moldable mixture has a density of 0.9 g/cm$^3$ or more.

2. The protein bar according to claim 1, wherein the collagen hydrolysate is produced by enzymatic hydrolysis of a collagen-containing starting material.

3. The protein bar according to claim 2, wherein the collagen-containing starting material is selected from the skin or bones of vertebrates.

4. The protein bar according to claim 1, wherein the collagen hydrolysate is produced by recombinant gene expression.

5. The protein bar according to claim 1, wherein the proportion of collagen hydrolysate in the moldable mixture is in the range of 5 to 50 weight %.

6. The protein bar according to claim 1, wherein the moldable mixture contains a total quantity of proteins and/or protein hydrolysates of at least 50 weight % of the moldable mixture.

7. The protein bar according to claim 1, wherein in addition to collagen hydrolysate the moldable mixture contains one or more proteins and/or protein hydrolysates.

8. The protein bar according to claim 1, wherein the proportion of collagen hydrolysate in relation to the total quantity of proteins and/or protein hydrolysates is in the range of 10 to 70 weight %.

9. The protein bar according to claim 1, wherein the moldable mixture further contains one or more vegetable fats.

10. The protein bar according to claim 1, wherein the moldable mixture further contains one or more sugar substitutes.

11. The protein bar according to claim 1, wherein the moldable mixture further contains one or more flavorings and/or sweeteners.

12. The protein bar according to claim 1, wherein the moldable mixture has a density of 1.0 $g/cm^3$ or more.

13. The protein bar according to claim 1, wherein the moldable mixture contains:
   5 to 50 weight % of collagen hydrolysate;
   0 to 45 weight % of further proteins and/or protein hydrolysates;
   5 to 15 weight % of vegetable fat;
   5 to 15 weight % of glycerol; and
   5 to 15 weight % of water.

14. The protein bar according to claim 1, wherein the protein bar has a weight of 5 to 100 g.

15. The protein bar according to claim 5, wherein the proportion of collagen hydrolysate in the moldable mixture is in the range of 30 to 50 weight %.

16. The protein bar according to claim 6, wherein the moldable mixture contains a total quantity of proteins and/or protein hydrolysates of at least 60 weight %.

17. The protein bar according to claim 16, wherein the moldable mixture contains a total quantity of proteins and/or protein hydrolysates of at least 65 weight %.

18. The protein bar according to claim 7, wherein the one or more proteins and/or protein hydrolysates are selected from milk proteins, whey proteins, soy proteins, wheat proteins and hydrolysates thereof, and further collagen hydrolysates.

19. The protein bar according to claim 13, wherein the moldable mixture contains 30 to 50 weight % of collagen hydrolysate.

20. The protein bar according to claim 13, wherein the moldable mixture contains 5 to 30 weight % of further proteins and/or protein hydrolysates.

* * * * *